May 17, 1966

O. M. KIEL 3,251,416

METHOD FOR IMPROVING PERMEABILITY

Filed April 1, 1963

Othar M. Kiel  INVENTOR.

BY *James E. Reed*
ATTORNEY

Othar M. Kiel INVENTOR.

ATTORNEY

United States Patent Office 3,251,416
Patented May 17, 1966

3,251,416
METHOD FOR IMPROVING PERMEABILITY
Othar M. Kiel, Tulsa, Okla., assignor, by mesne assignments, to Esso Production Research Company, Houston, Tex., a corporation of Delaware
Filed Apr. 1, 1963, Ser. No. 269,518
13 Claims. (Cl. 166—44)

The present invention relates to fluid flow through underground formations and is particularly concerned with a method for improving the permeability of such formations in the vicinity of injection wells, production wells and similar boreholes.

One of the problems encountered in operations requiring the injection or production of fluids through subterranean formations is that of maintaining permeability. Experience has shown that the continued injection or production of water, oil, natural gas and similar fluids generally leads to the accumulation of sediment, hydrocarbon residues and other material on the face of the formation and in the adjacent pore spaces and that this is accompanied by a steady decline in the injection or production rate. Conventional methods for restoring permeability and thus maintaining acceptable rates involve the use of mechanical devices to scrape the borehole walls, the introduction of acids or solvents to dissolve the plugging material, or the injection of viscous fluids containing suspended solids under sufficient pressure to fracture the formation and expose new surfaces. None of these methods is wholly satisfactory. Studies have shown that mechanical scrapers and similar devices are only partially effective, that acids and solvents frequently fail to dissolve the foreign matter, and that fracturing is often undesirable because of the high pressures required and because of the danger of increasing water or gas production. Moreover, such methods are generally expensive and time consuming and may be difficult to justify from an economics standpoint.

It is therefore an object of the present invention to provide an improved method for increasing the permeability of subsurface formations in the vicinity of wells and similar boreholes. Another object is to provide a method for improving the permeability of underground formations surrounding wells used for the injection or production of water, oil, natural gas and similar fluids. A further object is to provide a method for the removal of foreign matter from injection and production wells which can be carried out more rapidly and at less expense than with methods employed in the past. Still other objects will become apparent as the invention is described in greater detail hereafter.

In accordance with the invention, it has now been found that difficulties encountered due to the accumulation of plugging material on subsurface formations surrounding injection and production wells and in the adjacent pore spaces can be largely avoided by an improved method for removing such material at periodic intervals. Tests have shown that subjecting the formation surrounding a well to a series of high pressure impulses, reducing the well bore pressure to levels significantly below the formation pressure between impulses, and circulating fluid to the surface will permit the removal of sediment, hydrocarbon residues and other material and will often restore permeability to levels equal to or greater than the initial value. By repeating this treatment periodically, satisfactory injection and production rates can generally be maintained with less time and at lower expense than with methods available in the past.

The nature and objects of the invention can be best understood by referring to the following detailed description of the method and apparatus which may be employed in conjunction therewith and to the accompanying drawing, in which.

Figure 1:
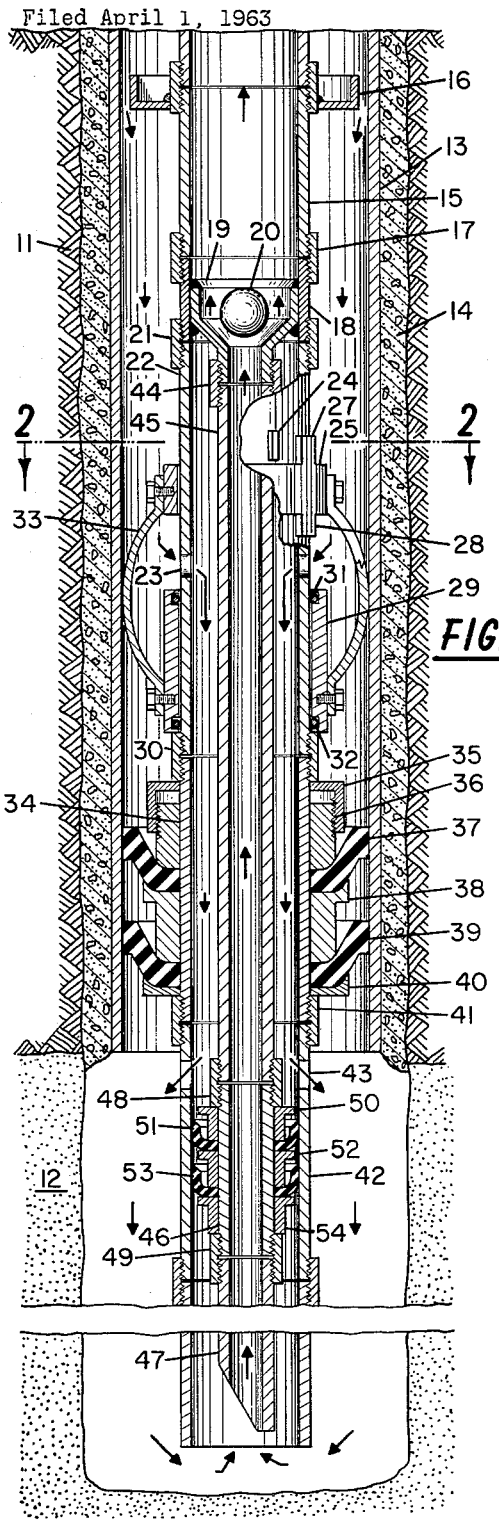
FIGURE 1 is a vertical elevation, partially in section, of a wellbore containing apparatus which may be used in practicing the invention.

The wellbore depicted in FIGURE 1 of the drawing is a water injection well drilled through the overlying strata 11 into a porous subsurface formation 12. Casing 13 extends through the upper strata and has been cemented in place in the conventional manner. The cement is indicated by reference numeral 14. In the particular well shown, the casing does not extend into the lower section of the wellbore adjacent formation 12. In some cases, however, the entire wellbore may be cased and the casing may then be perforated opposite the formation of interest. A string of tubing 15 or a similar pipe string used in carrying out the method extends downwardly in the wellbore to a point near the upper boundary of the water injection zone. Flanges 16, only one of which is shown, are mounted on the outer surface of the tubing at intervals. It is preferred that the flanges be spaced about 360 feet apart and that each flange extend outwardly to within about ⅛ inch of the surrounding casing. The flanges increase resistance to movement of the tubing string in the surrounding fluid and may be cup-shaped as shown in order to increase the outer surface area and thus reduce wear due to contact with the casing. A ball seat and tailpipe hanger assembly is connected to the lower end of tubing 15 by coupling 17. This assembly may be fabricated by welding a short nipple 18 and a bell reducer 19 together as shown. Ball 20 seats within the reducer, thus providing a check valve which permits the circulation of fluid upwardly into the tubing string but precludes flow in the opposite direction.

A circulating slide valve assembly is connected to the ball seat and tailpipe hanger assembly by coupling 21. The slide valve assembly includes a tubular mandrel 22 containing ports 23 located in the mandrel wall. The ports are spaced about the mandrel at a uniform distance from its lower end. A key or similar projection 24 is located on the outer surface of the mandrel above the ports. Latching sleeve 25 is positioned on the mandrel and as shown in FIGURE 1 is located between ports 23 and projection 24. The sleeve contains a slot 26, shown in FIGURE 2 of the drawing, which permits it to move upwardly over the projection. Arms 27 and 28 extend upwardly and downwardly from the sleeve adjacent the slot in order to engage the projection as the sleeve is rotated relative to the mandrel. Coupling 21 limits upward movement of the sleeve on the mandrel. A tubular valve body 29 is mounted on the mandrel below the ports and in the position shown in FIGURE 1 seats against a coupling 30 connected to the lower end of the mandrel. O-rings or similar sealing members 31 and 32 are set in slots in the inner surface of the body near its upper and lower ends in order to provide a seal as the mandrel rotates and moves longitudinally with respect to the body. Valve assembly springs 33 are connected to the body and sleeve and extend outwardly in contact with casing 13. Circulating slide valve assemblies similar to that shown which may be utilized for purposes of the invention are available commercially and are illustrated on page 157 of the 1959–1960 catalog of the Guiberson Corporation of Dallas, Texas.

A casing packer assembly including a tubular packer mandrel 34 is connected to the lower end of coupling 30. Mounted on the mandrel is an upper retainer 35 which seats against the lower end of the coupling. A spacer 36 is threaded into place on the lower end of the retainer. Below this is an upper packer cup 37 of rubber or similar resilient material which extends outwardly around the mandrel to form a seal against casing 13. A second spacer 38 separates the upper cup on the mandrel from a lower cup 39 of similar shape. The lower cup is held in place against the second spacer by lower retainer 40. The spacers and retainers are preferably shaped to fit tightly against the packer cups and hold them in position as shown. A coupling 41 is threaded onto the lower end of the packer mandrel against the lower retainer in order to hold the casing packer assembly in place. A flow diverter tube 42 containing ports 43 located at intervals about the tube periphery is connected to the lower end of the coupling. The ports in the tube are preferably located a uniform distance below the upper end of the tube as shown.

The internal assembly connected to the ball seat and tailpipe hanger in the apparatus shown comprises an elongated tailpipe on which is mounted a tubing packer. The tailpipe, attached to the hanger by means of coupling 44, includes an upper tailpipe section 45, an intermediate section 46, and a lower section 47. The three sections are interconnected by couplings 48 and 49. The upper section of the tailpipe extends downwardly through the circulating valve and casing packer assemblies to a point adjacent the ports in diverter tube 42. The tubing packer assembly mounted on the intermediate section of the tailpipe includes an upper spacer 50, an upper cup 51 of rubber or similar resilient material, an intermediate spacer 52, a lower cup 53 similar to the upper cup, and a lower spacer 54. This assembly is held in place on the intermediate section between couplings 48 and 49. The lower tailpipe section 47 terminates within the diverter tube and is preferably beveled at its lower end along a plane extending at an angle of from about 45 to about 75° to the longitudinal axis of the apparatus.

Figure 2:
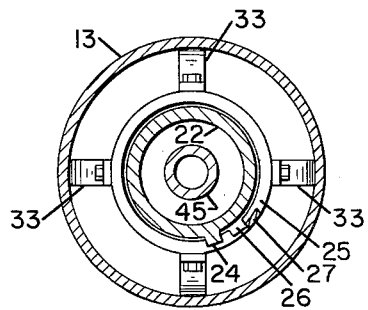
FIGURE 2 is a cross-sectional view of the apparatus of FIGURE 1 taken about the line 2—2.
Figure 3:
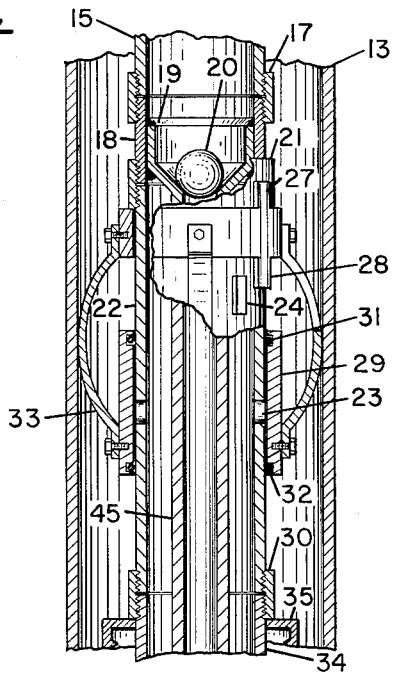
FIGURE 3 is a fragmentary view of the apparatus of FIGURE 1 showing the valve mechanism in a closed position.

The apparatus shown in FIGURES 1 through 3 of the drawing is employed by first lowering the tool into the wellbore in the position shown in FIGURE 1 of the drawing. The ball 20 is not used initially. Water, brine or a similar fluid is then injected downwardly through the annular space between the casing and the tubing 15 in order to flush out the wellbore below the casing. The injected fluid passes into the tubing through the ports 23 in valve assembly mandrel 22, flows downwardly within the casing packer mandrel, and emerges through ports 43 in flow diverter tube 42. Solids entrained by the fluid thus injected are carried upwardly through the tailpipe into the tubing and are discharged at the surface. The circulation of fluid in this manner may be stopped as soon as the discharged fluid is clean and essentially free of solids.

Following the initial cleanout step described above, the apparatus depicted in FIGURES 1 through 3 of the drawing is utilized to apply a series of high pressure impulses to the formation and to evacuate the wellbore adjacent the formation between impulses. This requires that the circulating slide valve in the apparatus be closed. The tubing string is first rotated in the wellbore in a counterclockwise direction until the projection 24 engages the arm 27 on sleeve 25. At this point, the projection is aligned with slot 26 in the sleeve. The tubing is then lowered so that the projection passes through the slot and emerges adjacent arm 28 on the lower end of the sleeve. The tubing is then rotated in a clockwise direction so that the projection is no longer aligned with the slot. The valve is then locked in a closed position with the body 29 covering ports 23 as shown in FIGURE 3 of the drawing. Springs 33 which extend between the valve body and sleeve in contact with the casing prevent movement of the body and sleeve as the tubing is rotated and lowered in the wellbore. Ball 20 is then dropped into place.

The entire apparatus, along with the fluid in the tubing above the ball and that in the surrounding annulus above casing packer cups 37 and 39, is lifted in the wellbore by raising the tubing at the surface after the circulating valve has been closed. This reduces the pressure in the wellbore opposite the exposed formation. In response to this change in pressure, fluids tend to flow into the wellbore from the formation. After the space below the apparatus has been partially filled with fluid, the apparatus is dropped in the wellbore. The impact created as it strikes the fluid in the lower part of the hole produces a high pressure impulse against the surrounding formation. Plugging material present on the face of the formation and in the adjacent pore spaces is loosened by the impulse. Some fracturing of the formation may also occur. After impact, the apparatus continues to move downwardly until the tubing is stopped at the surface. The flanges 16 on the tubing slow down the movement of the apparatus following impact and thus prevent damage to the diverter tube. Fluid displaced by the apparatus as it settles in place, together with any entrained plugging material, is forced upwardly past the cups 37 and 39. The apparatus is then lifted and dropped again. This procedure is repeated, with the circulation of fluid from the surface about every dozen cycles, until the fluid produced from the wellbore is essentially free of solids and foreign material.

The rate at which the apparatus is raised in the wellbore, the distance to which it is raised, and the period during which fluid is allowed to flow into the formation will depend upon conditions existing in the particular well. The rate must be sufficient to reduce the pressure in the wellbore to a level significantly below the formation pressure, the height must be sufficient to create the desired impact, and the period must be sufficient to permit the entry of enough fluid to cushion descent of the apparatus after impact.

Figure 4:
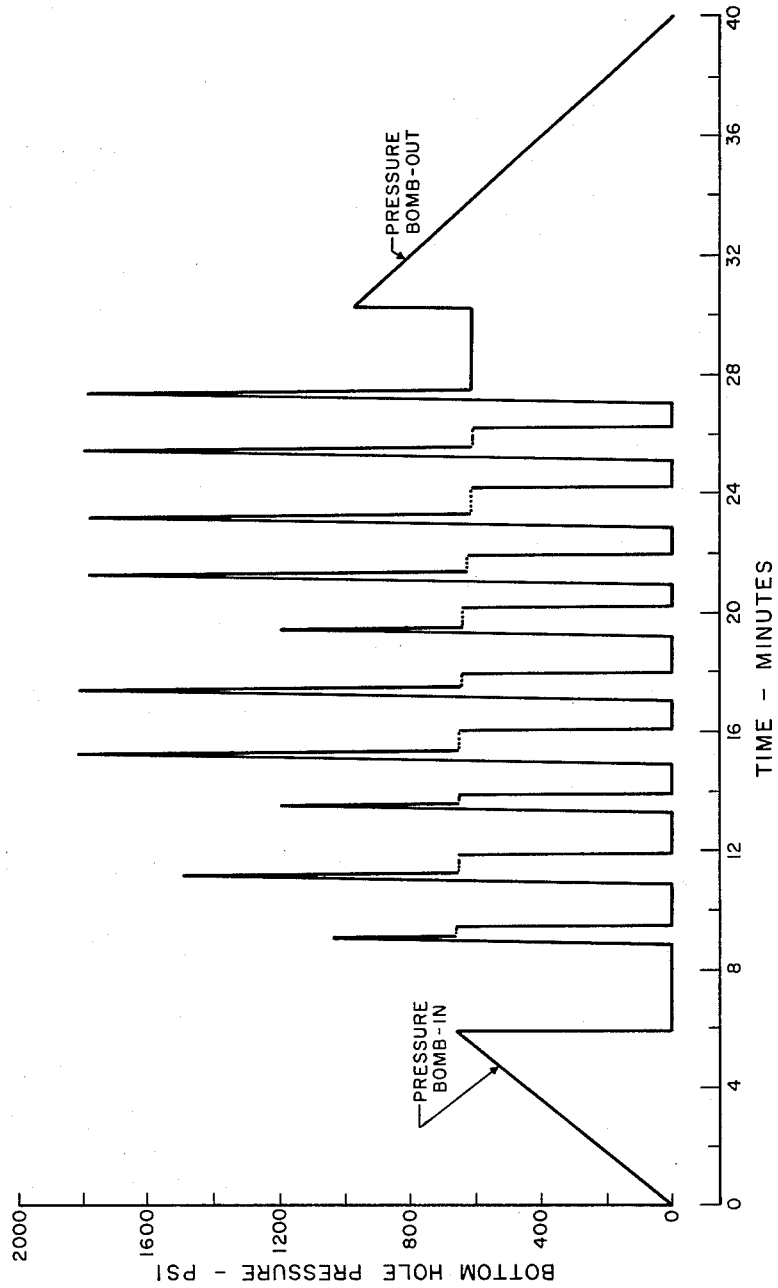
FIGURE 4 is a graph showing the variations in wellbore pressure during a typical application of the method.

FIGURE 4 of the drawing is a graph showing bottom hole pressure versus time during a typical application of the method. The original graph was obtained by lowering a conventional pressure bomb into the tailpipe of apparatus similar to that described above and leaving it in place during the treating operation. The sloping portion of the curve at the left of the graph shows the increase in pressure as the bomb was lowered into place at the bottom of the well. The vertical section of the curve next to the sloping portion represents the drop in pressure from an initial hydrostatic value of about 680 pounds per square inch to a value below atmospheric as the tool and fluid above it were raised in the wellbore. After about 3 minutes at the reduced pressure, the apparatus was dropped. This produced a sharp pressure pulse of about 1,000 pounds per square inch. Following this pulse, the pressure declined to the normal value of about 700 pounds per square inch. The apparatus was then raised and dropped again. This was repeated until 10 high pressure surges had been generated. In most instances the pressure pulse generated by dropping the apparatus was about 1800 pounds per square inch. The sloping portion of the curve on the right side of the graph shows the decline as the bomb was raised in the hole. Fluid was then circulated in the wellbore to remove solids dislodged by the alternate pressure-vacuum treatment. When the fluid reaching the surface was essentially free of solids, circulation was discontinued. The treatment represented by the graph of FIGURE 4 was repeated until the returns remained clear. The operation resulted in a 25 percent increase in injectivity and was much less expensive than a comparable acid treatment or fracturing operation.

As pointed out above, the pressure pulses shown in FIGURE 4 of the drawing had peak values of about 1800 pounds per square inch. This is typical of the values obtained in relatively shallow wells. In deeper wells, the pulse pressures may be much higher. In general, the peak values will exceed 1000 pounds per square inch and may be 15,000 pounds per square inch or higher, depending on the distance through which the apparatus is dropped and the head of liquid above the apparatus. It is generally preferred to lift and drop the apparatus through a vertical distance of at least ten feet.

Figures 5, 6:
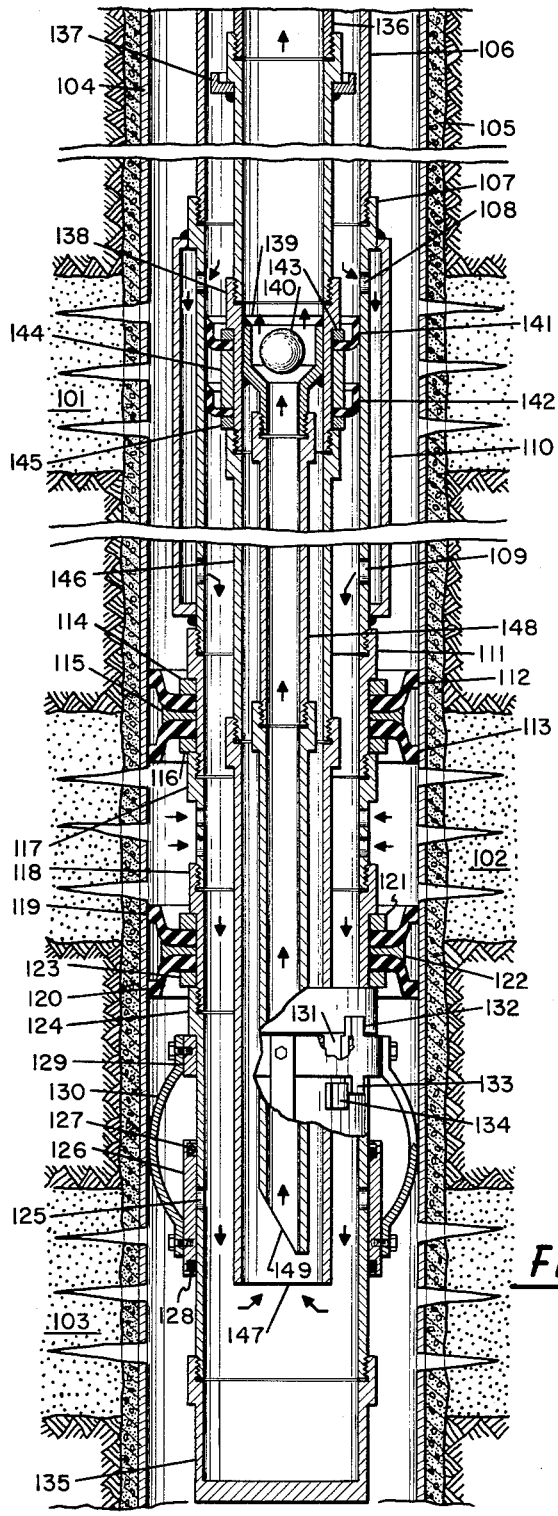
FIGURE 5 is a vertical elevation, in partial section, of a wellbore containing an alternate form of apparatus particularly useful in wells containing multiple injection or production zones.
FIGURE 6 is a vertical elevation, partially in section, of a wellbore containing apparatus which may be employed for carrying out the invention in deep wells containing one or more tubing strings.

FIGURE 5 of the drawing depicts an alternate embodiment of the apparatus intended for use in multiple zone wells. The wellbore depicted in FIGURE 5 extends through 3 separate producing zones. These zones are designated by reference numerals 101, 102 and 103.

Casing 104 extends through the three producing zones and has been perforated opposite each zone. The cement in the well is represented by reference numeral 105. An outer string of tubing 106 extends downwardly in the wellbore from the surface. Attached to this is a perforated section of tubing 107 containing upper ports 108 and lower ports 109. A sleeve 110 is welded in place over the ports or perforations to provide a by-pass through which fluid may be circulated. The perforated section and sleeve will normally be 10 feet or more in length. An upper packer assembly is connected below the perforated sleeve. The packer assembly includes a tubular supporting member 111, cups 112 and 113 of rubber or similarly resilient material, and spaces 114, 115 and 116. The cups and spacers are held in position on the supporting member by the upper end of a perforated sleeve 117 which is connected to the lower end of the upper packer assembly. Below the perforated sleeve is a lower packer assembly including supporting member 118, cups 119 and 120, and spacers 121, 122 and 123. The lower end of the lower packer assembly is connected to a circulating slide valve similar to that depicted in the earlier embodiment. The slide valve assembly includes a mandrel 124 containing ports 125. Valve body 126 including seal rings 127 and 128 extends over the ports and is free to slide and rotate with respect to the mandrel. A latching sleeve 129 connected to the body by springs 130 contains a slot 131 and adjacent upper and lower arms 132 and 133 which engage projection 134 on the mandrel. A cap 135 or similar closure is threaded to the lower end of the mandrel.

An inner string of pipe 136 fitted with flanges 137 at intervals along its length extends downwardly within tubing 106. A ball seat and tailpipe hanger assembly including a sleeve 138 within which a reducer 139 is welded in place in connected to the lower end of the inner pipe string and, in the position shown in FIGURE 5, is located between the upper and lower ports in sleeve 107. Ball 140 seats within the reducer and acts as a check valve. A packer assembly including cups 141 and 142 and spacers 143, 144 and 145 is mounted on the outer surface of sleeve 138. Lower pipe sections 146 and 147 extend downwardly in the outer tubing assembly to a point below the ports in the slide valve assembly. A tailpipe beveled at its lower end extends downwardly within the lower pipe below the ball seat and tailpipe hanger assembly. The tailpipe shown is made up of an upper section 148 and a lower section 149.

The apparatus shown in FIGURE 5 of the drawing is used in much the same manner as is that described earlier. The entire assembly is first lowered into the wellbore with the circulating valve open. The length of perforated section 117 has been selected so that the upper and lower packer assembly on the outer tubing will effect a seal above and below the perforations in the zone to be treated, in this case intermediate zone 102. The valve is closed and water or brine is then circulated downwardly through the annulus between the outer tubing 106 and the inner pipe 136. The downflowing fluid passes through the upper ports 108 and into the annular space between perforated section 107 and sleeve 110, and emerges from the lower ports 109, thus by-passing the packer assembly surrounding the ball seat and tailpipe hanger assembly. This fluid then flows to the lower end of the apparatus and is withdrawn through the tailpipe and upper pipe string to the surface. Fluid and entrained solids from producing zone 102 are picked up by the injected fluid and carried out of the well. Circulation is continued in this manner until the fluid reaching the surface is essentially free of solids and other foreign material.

Following the initial circulating step, ball 140 is dropped into place. The inner assembly is raised within the outer tubing string by lifting pipe 136 at the surface so that packer cups 141 and 142 are above port 108. Ball 140 and packer cups 141 and 142 prevent movement of the fluid in the upper part of the tubing string with respect to the inner pipe string. As the pipe and surrounding column of fluid are lifted further, the space in the lower part of the apparatus and that between the outer packers adjacent formation 102 are evacuated. The inner assembly and surrounding fluid are then dropped at the surface. This creates a sharp, high pressure impulse against the producing zone and serves to dislodge plugging material which may be present at the surface of the producing zone and in the adjacent pore spaces. When the apparatus is again lifted, the loosened material is swept into the lower part of the tool and may subsequently be circulated out of the wellbore. This procedure is repeated until substantially all of the plugging material has been removed and the permeability of the producing zone has been restored.

The apparatus shown in FIGURE 5 of the drawing can also be employed to treat an injection or production zone near the bottom of the well, even though the upper and lower packer assemblies on the outer tubing cannot be positioned on either side of the zone. This is done by lowering the apparatus into the wellbore to a point where the lowermost of the two outer packer assemblies is located a short distance above the zone to be treated. The circulating valve at the lower end of the assembly is left open to permit fluid flow between the producing zone and the interior of the assembly. The inner pipe string and associated components can then be raised and dropped in the manner described earlier in order to alternately decrease and increase the pressure on the formation.

Still another embodiment of the invention, this one designed for use in deep wells containing parallel pipe strings or in installations utilizing permanent well completion, is shown in FIGURE 6 of the drawing. The wellbore shown in FIGURE 6 contains casing 151 which has been cemented as indicated by reference numeral 152 and has been perforated opposite producing zone 153. A production packer 154 of conventional design through which tubing string 155 extends has been installed. The lower edge of the tubing is beveled as shown to minimize damage to the treating apparatus. The treating equipment used in this embodiment includes a pipe string 156 to which a tailpipe 157 and a packer assembly 158 are connected. The packer assembly includes cups 159 which provide a seal between the pipe string and the inner wall of the tubing. A wire-line plug 160 supported by line 161 and sinker bar 162 is seated within the pipe string adjacent the upper end of the tailpipe. The plug contains an internal passageway 163 and ball 164 and thus acts as a check valve. Cups 165 on the outer surface of the plug provide a seal against the inner wall of the surrounding pipe.

The apparatus shown in FIGURE 6 is utilized by first lowering the pipe string 156 with attached tailpipe 157 and packer assembly 158 into the well through tubing 155 until the packer assembly emerges below the lower end of the tubing. Plug 160 is not lowered into the pipe string until later. Fluid is then circulated downwardly through the annulus between the pipe string and tubing and returned through the tailpipe and pipe string in order to remove loosened foreign matter from the lower part of the wellbore. After the returns are reasonably clean, plug 160 is lowered into the pipe string by means of wire-line 161 and sinker bar 162. The ball and passageway in the plug permit movement of the plug through the fluid within the pipestring. After the plug has been seated against the upper surface of the tailpipe, the pipe string and tailpipe are lifted so that packer cups 159 are pulled into the tubing. The plug 160 is then lifted from the surface by means of the wire line to reduce the pressure in the lower part of the wellbore opposite the producing zone. The plug and liquid lifted with it are subsequently dropped in the pipe string to provide a high pressure impulse against the exposed formation. This is repeated several times to assure removal of plugging material from the face of the formation and from the adjacent pore spaces. The pipe string is then lowered until cups 159 again extend below the tubing. The plug is removed from the pipe string by means of the wire line. Fluid is then circulated into and out of the wellbore until returns free of dislodged plugging material are obtained. This sequence of steps may be repeated as many times as necessary in order to restore the permeability of the formation.

The effectiveness of the method can readily be seen by considering the results of field tests carried out on injection wells in a waterflooding project. The wells treated were completed in the conventional manner into an oil bearing sand about 1500 feet below the surface. All the wells had declined in injectivity and at the time of the treatment were taking water at rates well below the original rates. Each was treated with apparatus of the type shown in FIGURES 1 through 3 of the drawing. In each case, the apparatus was lowered into the well with the circulating valve open and water was injected with reverse circulation to remove any cavings or other loose solids present in the wellbore. After the returns from the wells appeared essentially free of entrained solids, the circulating valve was closed and the ball was dropped through the tubing to seat in the lower part of the apparatus. The tubing was then lifted in the wellbore about 30 feet, held for a short period to let water flow into the formation, and then slowly lowered in place. This procedure was repeated, varying the period for water influx, until the time required for water to fill about 40 to 50 percent of the void space beneath the packer on the apparatus had been determined. The tool assembly was then quickly raised, held for the required period, and dropped in the wellbore. This was done about a dozen times in order to alternately generate high pressure impulses against the formation and reduce the pressure between impulses. Following this, the circulating valve in the apparatus was opened. Water was then reverse circulated through the apparatus until clean returns were obtained. Large quantities of debris were washed from the wellbore. Some of the material had evidently been broken off the sand face, indicating that fractures of small magnitude may have been created. The broken material had a dark outer surface. Beneath this surface the rock was the same color as the original reservoir rock. Impact pressures of about 1800 p.s.i. were recorded during the treatments. The results obtained are shown in the following table:

| Well | Injectivity, b.p.d. | | Treatment Cost |
|---|---|---|---|
| | Before Treatment | After Treatment | |
| A | 30 | 163 | $790 |
| B | 20 | 54 | 400 |
| C | 0 | 26 | 840 |
| D | 88 | 116 | 876 |
| E | 200 | 250 | 637 |
| F | 54 | 60 | 464 |

Typical Fracturing Results in the same field were as follows:

| G | 20 | 65 | About $3,000 |

It can be seen from the data in the above table that treatment of the wells in accordance with the invention produced improvements in injection rates ranging from about 6 to over 100 barrels per day. The costs were less than one-third those for a normal fracturing or acidizing treatment in the same field. It is thus apparent that the method of the invention represents a substantial improvement over methods utilized in the past.

It will be apparent from the foregoing that the method of the invention is not limited to the particular apparatus described and that any of a variety of piston-like tools which can be lifted and dropped in the wellbore to produce alternate pressure pulses and reductions in pressure may be utilized. The method may be employed for the unplugging of well screens, gravel packs and the like.

What is claimed is:

1. A method for improving the permeability of a subterranean formation in the vicinity of a wellbore penetrating said formation which comprises:
    (a) lowering a tubular member provided with a packer element near the lower end thereof into said wellbore to effect and maintain a seal between said tubular member and the surrounding wellbore wall at a point a short distance above said formation;
    (b) closing off the bore of said tubular member at a point adjacent said formation;
    (c) lifting said tubular member within the wellbore with said packer element in contact with the wellbore wall at a rate and through a distance sufficient to partially evacuate the wellbore adjacent said formation and pull fluids from the formation into said wellbore;
    (d) dropping said tubular member in said wellbore through a distance sufficient to create a high pressure impulse against said formation; and
    (e) thereafter flushing solids from the vicinity of said formation by injecting a fluid into said wellbore from the earth's surface and withdrawing fluid containing entrained solids.

2. A method as defined by claim 1 wherein said tubular member is lifted at a rate and through a distance sufficient to reduce the pressure adjacent said formation to a value below atmospheric pressure.

3. A method as defined by claim 1 wherein said tubular member is dropped a sufficient distance to create an impulse having a peak value in excess of about 1000 pounds per square inch.

4. A method as defined by claim 1 wherein said tubular member is lifted and dropped at the end of a wire line.

5. A method as defined by claim 1 wherein said tubular member is lifted and dropped by raising and dropping a string of pipe to which said member is connected.

6. A method for improving the permeability of a subterranean formation in the vicinity of a borehole penetrating said formation which comprises:
    (a) isolating the lower portion of said borehole adjacent said formation from the upper portion of said borehole by lowering a tubular member containing a packer element mounted on the outer surface thereof downwardly into said borehole adjacent said formation from the earth's surface;
(b) closing off the bore of said tubular member at a point adjacent said formation;
(c) lifting said tubular member and liquids present in said borehole above said packer element by raising said member at the earth's surface with said packer element in contact with the borehole wall and with bore of said member closed off;
(d) dropping said tubular member and liquids present in the borehole above said packer element by releasing said member at the earth's surface; and
(e) thereafter flushing solids from the lower portion of said borehole adjacent said formation by injecting fluid into the borehole through a first passageway extending below said packer element and withdrawing fluid and entrained solids from the borehole through a second passageway extending below said packer element.

7. A method as defined by claim 6 wherein said tubular member is lifted and dropped in said borehole through a vertical distance of at least 10 feet.

8. A method as defined by claim 6 wherein said tubular member is repeatedly lifted and dropped in said borehole and solids are thereafter flushed from the borehole.

9. A method for improving the permeability of a subterranean formation surrounding a wellbore penetrating said formation which comprises:
(a) isolating the portion of said wellbore adjacent said formation from the upper part of said wellbore above said formation by lowering a first tubular member provided with a packer element on the outer surface thereof above ports in the wall of said member into said wellbore until said packer element is located adjacent to but above said formation;
(b) lowering a second tubular member provided with a packer element on the outer surface thereof into said first tubular member until the packer element on said second member is located adjacent to but above said formation;
(c) closing off the bore of said second tubular member at a point adjacent to said formation;
(d) lifting said second tubular member and liquids present in said first member above the packer element on said second member by raising said second member at the earth's surface with said packer element on said second member in contact with the wall of said first member;
(e) dropping said second member and liquids present in said first member above the packer on said second member by releasing said second member at the earth's surface; and
(f) thereafter flushing solids from the vicinity of said formation by injecting fluid into the wellbore through a first passageway formed by said tubular members and withdrawing fluid and entrained solids through a second passageway formed by said tubular members.

10. A method as defined by claim 9 wherein the bore of said second tubular member is closed off by dropping a ball in said second member from the earth's surface.

11. A method as defined by claim 9 wherein the portion of said wellbore adjacent said formation is isolated from the upper part of said wellbore above said formation and from the lower part of said wellbore below said formation by providing upper and lower packer elements on the outer surface of said first tubular member.

12. A method for improving the permeability of a subterranean formation surrounding a well containing multiple conduits which comprises:
(a) lowering a string of pipe fitted with a packer near the lower end thereof in one conduit of said well until said packer emerges below said conduit;
(b) injecting fluid into said well and withdrawing the injected fluid through passageways formed by said conduit and said string of pipe;
(c) lowering a piston-like plug at the end of a wire line into said string of pipe to a point a short distance above the lower end thereof and thereby closing off said pipe at said point;
(d) lifting said string of pipe in said conduit until said packer seals the lower end thereof;
(e) lifting said plug in said string of pipe from the earth's surface by means of said wire line a sufficient distance to partially evacuate the portion of said well adjacent the lower end of said conduit and pull fluids into the well from the surrounding formation;
(f) dropping said plug in said string of pipe a sufficient distance to create a high pressure impulse on said formation;
(g) thereafter lowering said string of pipe in said conduit until said packer emerges from the lower end of the conduit;
(h) withdrawing said plug from said string of pipe by means of said wire line; and
(i) again injecting fluid into said well and withdrawing the injected fluid through passageways formed by said conduit and said string of pipe.

13. A method as defined by claim 12 wherein said plug is repeatedly lifted and dropped in said string of pipe before said string of pipe is lowered in said conduit and said plug is withdrawn.

References Cited by the Examiner
UNITED STATES PATENTS

| | | | |
|---|---|---|---|
| 2,237,612 | 4/1941 | Myracle | 166—177 |
| 2,355,259 | 8/1944 | Bancroft et al. | 166—177 X |
| 2,687,774 | 8/1954 | Hodges | 166—44 |
| 2,907,390 | 10/1959 | Moll | 166—44 |
| 2,935,132 | 5/1960 | Arterbury | 166—177 |
| 3,016,093 | 1/1962 | Bodine | 166—43 |

CHARLES E. O'CONNELL, Primary Examiner.

C. H. GOLD, J. A. LEPPINK, Assistant Examiners.